(12) United States Patent
Sasaki et al.

(10) Patent No.: US 11,485,347 B2
(45) Date of Patent: Nov. 1, 2022

(54) DRIVE FORCE CONTROL SYSTEM FOR VEHICLE

(71) Applicant: TOYOTA JIDOSHA KABUSHIKI KAISHA, Toyota (JP)

(72) Inventors: Keisuke Sasaki, Susono (JP); Yoshio Ueno, Izunokuni (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 17/145,850

(22) Filed: Jan. 11, 2021

(65) Prior Publication Data

US 2021/0213931 A1 Jul. 15, 2021

(30) Foreign Application Priority Data

Jan. 15, 2020 (JP) .............................. JP2020-004067

(51) Int. Cl.
*B60W 20/10* (2016.01)
*B60K 6/387* (2007.10)
*B60K 6/52* (2007.10)
*B60K 6/54* (2007.10)

(52) U.S. Cl.
CPC .............. *B60W 20/10* (2013.01); *B60K 6/387* (2013.01); *B60K 6/52* (2013.01); *B60K 6/54* (2013.01); *B60Y 2200/92* (2013.01); *B60Y 2400/82* (2013.01)

(58) Field of Classification Search
CPC ......... B60W 20/10; B60K 6/387; B60K 6/54; B60Y 2200/92
See application file for complete search history.

(56) References Cited

U.S. PATENT DOCUMENTS

| | | | |
|---|---|---|---|
| 11,267,456 B2 * | 3/2022 | Kohno .................. | B60K 6/445 |
| 2002/0123409 A1 | 9/2002 | Suzuki et al. | |
| 2013/0079192 A1 * | 3/2013 | Terakawa .............. | B60W 30/19 903/902 |
| 2014/0148986 A1 * | 5/2014 | Yoshikawa ........... | B60W 20/10 903/930 |
| 2014/0221152 A1 * | 8/2014 | Tsutsumi .............. | B60W 20/40 180/65.265 |
| 2018/0170166 A1 * | 6/2018 | Sugiyama .............. | B60K 6/547 |
| 2018/0170345 A1 * | 6/2018 | Katsumata ............. | B60K 6/365 |
| 2021/0261114 A1 * | 8/2021 | Sasaki ................... | B60K 6/448 |

FOREIGN PATENT DOCUMENTS

| | | |
|---|---|---|
| JP | 2002-204506 A | 7/2002 |
| JP | 2006-159929 A | 6/2006 |
| JP | 2014-104846 A | 6/2014 |

* cited by examiner

*Primary Examiner* — Carl C Staubach
(74) *Attorney, Agent, or Firm* — Oliff PLC

(57) ABSTRACT

A drive force control system for a vehicle configured to change a torque to propel a vehicle certainly in a required amount by controlling output torques of an engine and a motor. A controller is configured to: calculate a required amount of change in synthesized torque of an engine torque and a motor torque; calculate a required amount of change in the engine torque and a required amount of change in the motor torque based on the required amount of change in the synthesized torque; select one of the engine and the motor whose torque will be changed further than a limit value; and adjust the torque of the selected prime mover by a counter torque.

8 Claims, 8 Drawing Sheets

DRIVE FORCE CONTROL SYSTEM FOR VEHICLE

CROSS-REFERENCE TO RELATED APPLICATIONS

The present disclosure claims the benefit of Japanese Patent Application No. 2020-004067 filed on Jan. 15, 2020 with the Japanese Patent Office.

BACKGROUND

Field of the Invention

Embodiments of the present disclosure relate to the art of a drive force control system for a vehicle powered by a plurality of prime movers.

Discussion of the Related Art

Examples of a control system for a hybrid vehicle comprising an engine, a motor connected to an output shaft of the engine, and a transmission connected to the motor are disclosed in JP-A-2002-204506, JP-A-2006-159929, and JP-A-2014-104846. Each control system described in the above-listed prior art documents is configured to reduce a torque of at least one of the engine and the motor to propel the vehicle, if it is necessary to reduce a torque delivered to a transmission when changing a speed ratio of the transmission.

The control apparatus taught by JP-A-2002-204506 is configured to reduce a torque of a motor preferentially to prevent an increase of emission when reducing a torque of an engine significantly. According to the teachings of JP-A-2002-204506, specifically, a maximum possible reduction amount of a motor torque is calculated based on a state of charge level of a battery. Then, the torque of the motor is reduced in accordance with the calculated maximum possible reduction amount, and the torque of the engine is reduced based on a difference between a required reduction amount of a drive torque delivered to a transmission and the maximum possible reduction amount of the torque of the motor.

A maximum output torque of a motor is easy to be changed depending on e.g., a temperature and a state of charge level of a battery. Therefore, the control device taught by JP-A-2006-159929 is configured to reduce a torque of an engine preferentially, and to reduce a torque of the motor based on a difference between a required reduction amount of a drive torque delivered to a transmission and a reduction amount of the torque of the engine.

If a vehicle is expected to be accelerated after decelerating the vehicle, or if a downshifting is expected to be executed during deceleration, a drive torque generated by an engine and a motor will be reduced temporarily, and then increased again. In those cases, the control device taught by JP-A-2014-104846 increases a reduction amount of the motor torque greater than a reduction amount of the engine torque so as to improve an acceleration response while preventing a reduction in fuel efficiency due to a change in an operating point of the engine.

According to the teachings of JP-A-2002-204506, the motor torque is reduced preferentially when it is necessary to reduce the drive torque. However, a reduction amount of the motor torque may be restricted depending on e.g., a state of charge level of the battery. That is, the drive torque may not be reduced sufficiently by merely reducing the motor torque if the reduction amount of the motor torque is restricted.

By contrast, according to the teachings of JP-A-2006-159929, the engine torque is reduced preferentially when it is necessary to reduce the drive torque. However, if the engine has a supercharger, a change rate of the engine torque is changed when stopping the supercharger. In this case, therefore, the engine torque may not be reduced promptly until the supercharger is stopped. In addition, an ignition timing, a fuel injection, an opening degree of a throttle valve etc. have to be controlled when stopping the supercharger. In this case, therefore, a complicated control is required to reduce the engine torque.

According to the teachings of JP-A-2014-104846, when reducing the drive torque temporarily, the reduction amount of the motor torque is increased greater than the reduction amount of the engine torque so that a difference between a reduced motor torque and a maximum motor torque is increased. According to the teachings of JP-A-2014-104846, therefore, the motor torque can be increased significantly when increasing the drive torque so that the acceleration response can be improved. According to the teachings of JP-A-2014-104846, however, the motor torque may be reduced to a lower limit torque of the motor. In this case, therefore, the difference between the reduced motor torque and the maximum motor torque may not be ensured sufficiently when increasing the drive torque again.

SUMMARY

Aspects of embodiments of the present disclosure have been conceived noting the foregoing technical problems, and it is therefore an object of the present disclosure to provide a drive force control system for a vehicle configured to change a torque to propel a vehicle certainly in a required amount by controlling output torques of plurality of prime movers.

The drive force control system according to the exemplary embodiment of the present disclosure is applied to a vehicle having at least a first prime mover and a second prime mover, and the drive force control system controls a synthesized torque of an output torque of the first prime mover and an output torque of the second prime mover by controlling the output torque of the first prime mover and the output torque of the second prime mover. In order to achieve the above-explained objective, according to the exemplary embodiment the present disclosure, the drive force control system is provided with a controller that controls the output torque of the first prime mover and the output torque of the second prime mover. Specifically, the controller is configured to: calculate a required amount of change in the synthesized torque; calculate a first required amount of change in the output torque of the first prime mover and a second required amount of change in the output torque of the second prime mover based on the required amount of change in the synthesized torque; determine whether the output torque of the first prime mover will be changed further than a limit value given that a current output torque thereof is changed in the first required amount of change; determine whether the output torque of the second prime mover will be changed further than a limit value given that a current output torque thereof is changed in the second required amount of change; select one of the first prime mover and the second prime mover whose output torque will be changed further than the limit value given that the current output torque is changed in the required amount of change; adjust the output torque of the selected prime mover by a counter torque to increase a difference from the limit value before changing the synthesized torque; and adjust the output torque of the other prime mover by an adjuster torque that is a torque in the opposite direction to and of the same magnitude as the counter torque before changing the synthesized torque.

In a non-limiting embodiment, the controller may be further configured to select one of the prime movers whose required amount of change in the output torque is greater so as to adjust the output torque thereof by the counter torque, if both of the output torques of the first prime mover and the second prime mover are expected to be changed further than the limit values.

In a non-limiting embodiment, the controller may be further configured to select one of the prime movers that it is necessary to create a margin to change the output torque thereof in the required amount of change so as to adjust the output torque thereof by the counter torque, if both of the output torques of the first prime mover and the second prime mover are expected to be changed further than the limit values.

In a non-limiting embodiment, the controller may be further configured to select one of the prime movers whose output torque is not allowed to be changed further than the limit value so as to adjust the output torque thereof by the counter torque, if both of the output torques of the first prime mover and the second prime mover are expected to be changed further than the limit values.

In a non-limiting embodiment, the controller may be further configured to calculate the counter torque based on an exceedance of the output torque of the selected prime mover changed in the required amount of change from the limit value.

In a non-limiting embodiment, the controller may be further configured to: calculate an exceedance of the output torque of the selected prime mover changed in the required amount of change from the limit value; set the adjuster torque to a torque of same magnitude as the exceedance of the output torque of the selected prime mover from the limit value; determine whether the output torque of the other prime mover will be changed further than the limit value given that the output torque of the other prime mover is adjusted by the adjuster torque; and correct the counter torque to an exceedance of the output torque of the other prime mover changed in the required amount of change from the limit value.

In a non-limiting embodiment, the controller may be further configured to control the output torque of the selected prime mover in such a manner as to increase a difference from the limit value, while controlling the output torque of the other prime mover in such a manner as to achieve the required synthesized torque, after or during changing the output torques of the first prime mover and the second prime mover in the first required amount and the second required amount.

In a non-limiting embodiment, the vehicle may comprise: an engine; a motor whose output torque can be added to an output torque of the engine; a clutch device to which a synthesized torque of the output torque of the engine and the output torque of the motor is delivered, and in which a torque transmitting capacity can be varied; and a transmission connected to an output side of the clutch device that executes a speed change operation. In addition, the controller may be further configured to change the synthesized torque while reducing the torque transmitting capacity of the clutch device when executing the speed change operation of the transmission.

Thus, according to the exemplary embodiment of the present disclosure, the first required amount of change of the first prime mover and the second required amount of change of the second prime mover are calculated based on the required amount of change in the synthesized torque. Then, the controller selects one of the first prime mover and the second prime mover whose output torque will be changed further than the limit value given that the current output torque is changed in the required amount of change. The output torque of the selected prime mover is adjusted by the counter torque so as to increase a difference from the limit value before changing the synthesized torque. According to the exemplary embodiment of the present disclosure, therefore, the output torque of the selected prime mover may be changed in the required amount of change without being restricted by the limit value so that the synthesized torque can be changed certainly in the required amount. On the other hand, the output torque of the other prime mover is adjusted by the adjuster torque so that the synthesized torque is maintained to a constant value before changing the synthesized torque.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
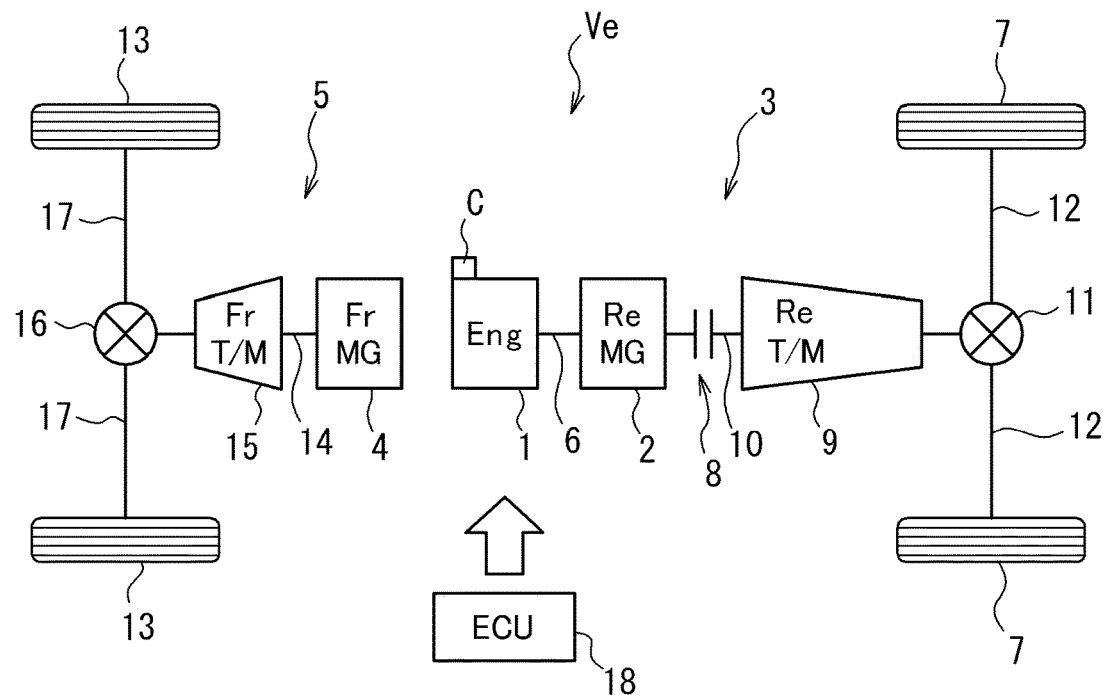
FIG. 1 is a schematic illustration showing a structure of a vehicle to which the drive force control system according to the exemplary embodiment of the present disclosure is applied.

An exemplary embodiment of the present disclosure will now be explained with reference to the accompanying drawings. Referring now to FIG. 1, there is shown one example of a structure of a vehicle Ve to which the drive force control system according to the embodiment of the present disclosure is applied. The vehicle Ve shown in FIG. 1 is a four-wheel drive layout hybrid vehicle in which a prime mover comprises: a rear drive unit 3 including an engine (referred to as "Eng" in FIG. 1) 1, and a rear motor (referred to as "Rr MG" in FIG. 1) 2; and a front drive unit 5 including a front motor (referred to as "Fr MG" in FIG. 1) 4.

For example, a gasoline engine and a diesel engine may be adopted as the engine 1, and an output torque of the engine 1 is changed by controlling an intake air, a fuel injection, and an ignition timing. When the engine 1 is rotated passively while stopping a fuel supply thereto, a brake force derived from a fiction torque and a pumping loss is applied to an output shaft 6 of the engine 1. For example, a magnitude of the pumping loss may be changed by controlling an opening degree of a throttle valve (not shown) for controlling an air intake.

According to the example shown in FIG. 1, the engine 1 is provided with a supercharger C that is driven by an exhaust gas emitted from the engine 1 to increase an air intake. That is, an output torque of the engine 1 can be increased by actuating the supercharger C.

For example, an AC motor such as permanent magnet synchronous motor and an induction motor may be adopted as the rear motor 2 and the front motor 4, respectively. That is, each of the rear motor 2 and the front motor 4 may serve not only as a motor to generate a torque to increase a rotational speed of an output shaft thereof, but also as a generator to partially translate a power of the output shaft into an electric power.

The torque distributed to the rear wheels 7 is controlled by the rear drive unit 3. In the rear drive unit 3, a rotor of the rear motor 2 is fitted onto the output shaft 6 of the engine 1 through e.g., a spline so that a torque of the rear motor 2 is added to the output shaft 6. Instead, the rear motor 2 may also be connected to the engine 1 through a gear pair, a torque converter, a clutch device or the like.

The output shaft 6 of the engine 1 further extends from the rear motor 2 to a rear section of the vehicle Ve, and a leading end of the output shaft 6 is connected to a clutch device 8. For example, a dog clutch and a friction clutch may be adopted as the clutch device 8, and a torque transmission between the rear motor 2 and a rear transmission (referred to as "Re T/M" in FIG. 1) 9 is interrupted by disengaging the clutch device 8.

Specifically, the rear transmission 9 is connected to an output shaft 10 of the clutch device 8 so that rotational speeds of the engine 1 and the rear motor 2 are changed by the rear transmission 9. For example, a geared transmission having a plurality of engagement devices and a continuously variable transmission may be adopted as the rear transmission 9. In a case of using the geared transmission as the rear transmission 9, a gear stage of the rear transmission 9 is shifted among a plurality of stages by manipulating the engagement devices. In a case of using the continuously variable transmission as the rear transmission 9, a speed ratio of the rear transmission 9 may be varied continuously. The rear transmission 9 is connected to a pair of rear wheels 7 through a rear differential gear unit 11 and rear driveshafts 12.

The output torque of the engine 1 and the output torque of the rear motor 2 are delivered to the rear transmission 9, and further delivered to the rear wheels 7 while being changed in accordance with a speed ratio set by the rear transmission 9. In the rear drive unit 3, therefore, the torque delivered to the rear transmission 9 and the rear wheels 7 may be changed by changing any one of the torques of the engine 1 and the rear motor 2.

The output torque of the engine 1 is controlled based on a speed of the engine 1 in such a manner as to adjust an operating point of the engine 1 to a most fuel efficient point. On the other hand, the output torque of the rear motor 2 may be set to a torque corresponding to a difference between a target input torque to the rear transmission 9 and the output torque of the engine 1. Specifically, the target input torque to the rear transmission 9 may be calculated based on a required drive force to propel the vehicle Ve and a speed ratio of the rear transmission 9. That is, if the target input torque to the rear transmission 9 is greater than the output torque of the engine 1, the rear motor 2 generates a torque to achieve the target input torque. By contrast, if the target input torque to the rear transmission 9 is less than the output torque of the engine 1, the rear motor 2 generates a brake torque to cancel an excess torque.

When the required drive force is changed, or when changing the speed ratio of the rear transmission 9, the output torques of the engine 1 and the rear motor 2 will be changed. In this situation, for example, the output torque of the rear motor 2 having a faster response may be changed more significantly than the output torque of the engine 1 so as to change the torque to be delivered to the rear transmission 9 more quickly. Otherwise, if a required amount of change in the output torques of the engine 1 and the rear motor 2 is large, the output torque of the engine 1 which can generate relatively larger torque may also be changed more significantly than the output torque of the rear motor 2. Thus, a ratio between the output torque of the engine 1 and the output torque of the rear motor 2 may be changed according to need.

On the other hand, the torque distributed to front wheels 13 is controlled by the front drive unit 5. In the front drive unit 5, an output shaft 14 of the front motor 4 is connected to a front transmission (referred to as "Fr T/M" in FIG. 1) 15. For example, a geared transmission and a continuously variable transmission may also be adopted as the front transmission 15. The front transmission 15 is connected to the front wheels 13 through a front differential gear unit 16 and front driveshafts 17.

The engine 1, the rear motor 2, the front motor 4, the rear transmission 9, the front transmission 15, the clutch device 8 and so on are controlled by an electronic control unit (to be abbreviated as the "ECU" hereinafter) 18 as a controller. The ECU 18 comprises a microcomputer as its main constituent that is configured to preform calculation based on incident data transmitted from sensors arranged in the vehicle Ve, and formulas and maps installed in advance. Calculation results are transmitted from the ECU 18 to the devices controlled by the ECU 18 in the form of command signal.

For example, the ECU 18 receives data about: a speed of the vehicle Ve detected by a vehicle speed sensor; speeds of the engine 2 and the rear motor 2 detected by an engine speed sensor and a rear motor speed sensor; a speed of the front motor 4 detected by a front motor speed sensor; a position of an accelerator pedal (not shown) detected by an accelerator sensor; and a state of charge (to be abbreviated as "SOC" hereinafter) level of an electric storage device (not shown) detected by a battery sensor (neither of the sensors are shown).

The maps installed in the ECU 18 include: a map determining a required drive force to propel the vehicle Ve based on a position of the accelerator pedal and a speed of the vehicle Ve; and maps determining speed ratios of the rear transmission 9 and the front transmission 15 based on a position of the accelerator pedal and a required drive force. In addition, a control flow for controlling output torques and speeds of the engine 1, the rear motor 2, and the front motor 4 during a transient state of speed change operations of the rear transmission 9 and the front transmission 15 is installed in the ECU 18. For example, a speed ratio of each of the rear transmission 9 and the front transmission 15 are governed by a shift map, and the speed change operations of the rear transmission 9 and the front transmission 15 are executed when speed ratios of the rear transmission 9 and the front transmission 15 are changed with reference to the shift maps.

An operating mode of the vehicle Ve may be selected from: an engine mode in which the vehicle Ve is propelled by delivering the output torque of the engine 1 to the rear wheels 7; and an electric vehicle mode in which the vehicle Ve is propelled by delivering the output torque of the front motor 4 to the front wheels 13 while interrupting a torque transmission between the engine 1 and the rear wheels 7. During propulsion in the engine mode, the output torque of the rear motor 2 may be added to the output torque of the engine 1, and an output power of the engine 1 may be translated partially into an electric power by the rear motor 2. In addition, during propulsion in the engine mode, an output torque of the front motor 4 may also be delivered to the front wheels 13 to generate a drive force.

In the electric vehicle mode, the clutch device 8 is disengaged. For example, in the electric vehicle mode, the output power of the engine 1 may be translated into the electric power by the rear motor 2, and the vehicle Ve may be propelled by supplying the electric power translated by the rear motor 2. Instead, in the electric vehicle mode, the vehicle Ve may also be propelled by supplying the electric power from the electric storage device.

The operating mode of the vehicle Ve, and a ratio between drive forces of the front wheels 13 and the rear wheels 7 are determined depending on operating conditions of the vehicle Ve. For example, in the engine mode, a speed ratio of the rear transmission 9 is determined based on a required drive force of the rear wheels 7 and a speed of the vehicle Ve. When the required drive force of the rear wheels 7 and the speed of the vehicle Ve are changed, the speed ratio of the rear transmission 9 is changed while adjusting the speeds of the engine 1 and the rear motor 2 to target speeds to be achieved after a speed change operation of the rear transmission 9 by reducing a torque transmitting capacity of the clutch device 8.

Specifically, in a case of executing a downshifting of the rear transmission 9, the speeds of the engine 1 and the rear motor 2 (i.e., an input speed to the rear transmission 9) will be increased. In this case, therefore, the input speed to the rear transmission 9 is increased by increasing torques of the engine 1 and the rear motor 2 while reducing a torque transmitting capacity of the clutch device 8. By contrast, in a case of executing an upshifting of the rear transmission 9, the input speed to the rear transmission 9 will be reduced. In this case, for example, the input speed to the rear transmission 9 may be reduced by reducing the torques of the engine 1 and the rear motor 2 while reducing the torque transmitting capacity of the clutch device 8. Instead, the input speed to the rear transmission 9 may be reduced by a brake torque derived from a pumping loss established by stopping a fuel supply to the engine 1, or a brake torque established by operating the rear motor 2 as a generator.

In those cases, if it is required to execute the speed change operation of the rear transmission 9 promptly, an amount of change in the torque of the rear motor having a faster response is increased. Otherwise, if a required amount of change in the torque is large, an amount of change in the torque of the engine 1 whose maximum torque is larger is increased. However, if a required amount of change in the torque of the rear motor 2 is large, the electric power supplied to the rear motor 2 from the electric storage device may exceed an upper limit power of the electric storage device, and the torque of the rear motor 2 may be restricted. On the other hand, the torque of the engine 1 may be restricted to prevent the supercharger C from starting or stopping when changing the torque of the engine 1. In those cases, the input torque to the clutch device 8 may not be achieved.

The drive force control system according to the exemplary embodiment of the present disclosure is configured to avoid restrictions of the output torques of the engine 1 and the rear motor 2 due to limit values of torques governed by structures of the engine 1 and the rear motor 2 and other conditions. The contents of the control executed by the drive force control system according to the exemplary embodiment of the present disclosure is schematically shown in FIG. 2.

Figure 2:
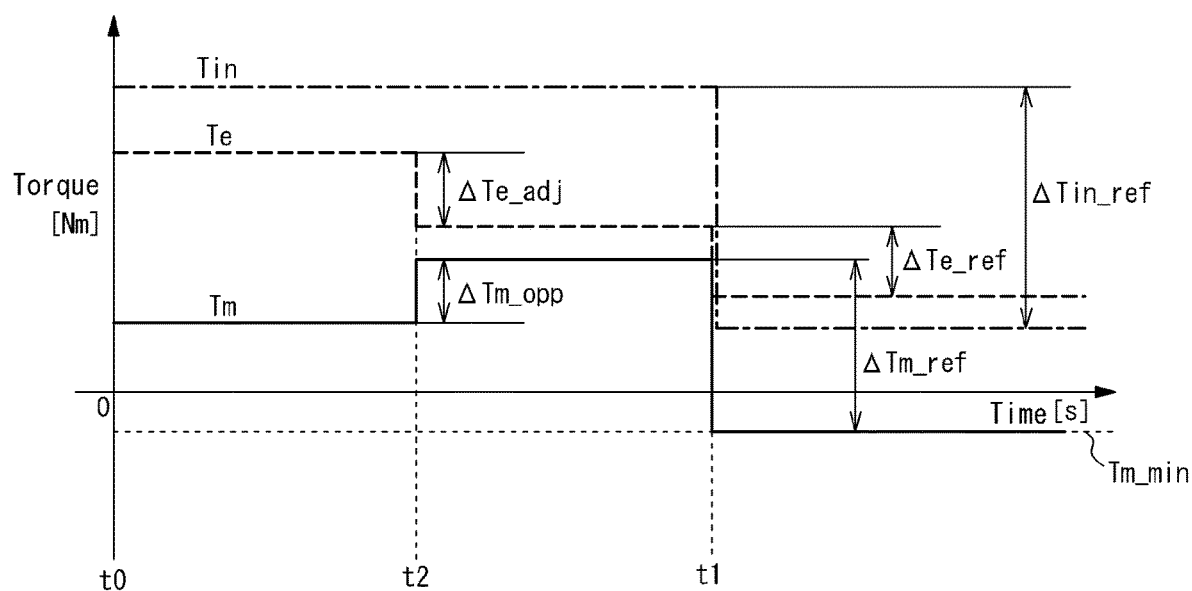
FIG. 2 is a time chart showing contents of the control executed by the drive force control system according to the exemplary embodiment of the present disclosure.

According to the example shown in FIG. 2, an input torque Tin to the clutch device 8 indicated by the dashed-dolled line as a synthesized torque of an output torque Te of the engine 1 indicated by the dashed line and an output torque Tm of the rear motor 2 indicated by the solid line is maintained to a constant value from point t0. An upshifting of the rear transmission 9 is started from point t1, therefore, the input torque Tin is reduced in accordance with a speed ratio of the rear transmission 9 to be achieved after the completion of the upshifting. In this case, a required amount of change $\Delta Tin\_ref$ of the input torque Tin may be calculated based on: a difference between an input speed to the clutch device 8 in accordance with a speed ratio before carrying out the upshifting, and an input speed to the clutch device 8 in accordance with a speed ratio of the rear transmission 9 after the completion of the upshifting; and an allowable period of time to change the input speed to the clutch device 8 to execute the upshifting.

Thus, the output torque Te of the engine 1 (as will be simply called the "engine torque Te" hereinafter) and the output torque Tm of the rear motor 2 (as will be simply called the "motor torque Tm" hereinafter) are controlled in accordance with the required amount of change ΔTin_ref of the input torque Tin to the clutch device 8. As described, a required amount of change ΔTe_ref of the engine torque Te and a required amount of change ΔTm_ref of the motor torque Tm to achieve the required amount of change ΔTin_ref are determined taking account of a required response of the speed change operation and the required amount of change ΔTin_ref. In the example shown in FIG. 2, the required amount of change ΔTm_ref of the motor torque Tm is set greater than the required amount of change ΔTe_ref of the engine torque Te.

In addition, in the example shown in FIG. 2, a state of charge level of the electric storage device is raised to the vicinity of an upper limit level, and hence a lower limit value Tm_min of the motor torque Tm is set to restrict a power generation of the rear motor 2. As indicated in FIG. 2, given that the motor torque Tm is reduced from point t0 in the required amount of change ΔTm_ref, the motor torque Tm is expected to reach the lower limit value Tm_min. In the example shown in FIG. 2, therefore, the motor torque Tm is increased in an opposite direction to the direction to achieve the required amount of change ΔTm_ref at point t2 before reducing the input torque Tin. Specifically, the motor torque Tm is increased in a direction to increase a difference from the lower limit value Tm_min within a period of time from a point at which an execution of the upshifting has been determined or a condition to execute the upshifting has been satisfied to a point at which the torque transmitting capacity of the clutch device 8 is reduced to a predetermined value. In the following explanations, an amount of the motor torque Tm changed in the direction to increase a difference from the lower limit value Tm_min will be called the "counter torque ΔTm_opp". Thus, the counter torque ΔTm_opp is added to the motor torque Tm so that the motor torque Tm will not be reduced to the lower limit value Tm_min even if the motor torque Tm is reduced in the required amount of change ΔTm_ref.

As a result of adding the counter torque ΔTm_opp to the motor torque Tm, the input torque Tin to the clutch device 8 will be increased. Therefore, in order to maintain the input torque Tin to the clutch device 8 to a constant value, the engine torque Te is reduced at point t2 in an amount of "adjuster torque ΔTe_adj". To this end, a torque in the opposite direction to and of the same magnitude as the counter torque ΔTm_opp is set as the adjuster torque ΔTe_adj.

Then, when reducing the input torque Tin to the clutch device 8 at point t1, the motor torque Tm which has been increased in the amount of the counter torque ΔTm_opp is reduced in the required amount of change ΔTm_ref, and the engine torque Te which has been reduced in the amount of adjuster torque ΔTe_adj is further reduced in the required amount of change ΔTe_ref.

Thus, when changing e.g., the motor torque Tm in the required amount of change ΔTm_ref, the counter torque ΔTm_opp is added to the motor torque Tm which is expected to be reduced further than the lower limit value Tm_min, and then the motor torque Tm is reduced in the required amount of change ΔTm_ref. Therefore, the motor torque Tm can be reduced certainly in the required amount of change ΔTm_ref without being restricted by the lower limit value Tm_min. That is, the input torque Tin to the clutch device 8 can be reduced certainly and promptly in the required amount of change ΔTin_ref.

For example, in a case of reducing the engine torque Te until the supercharger C is stopped, the engine torque Te is reduced for an excessively long period of time. In this case, therefore, the reduction in the engine torque Te may be restricted during a transient state of a speed change operation before the supercharger C is stopped. That is, a lower limit value of the engine torque Te may be set during the transient state of the speed change operation before the supercharger C is stopped. In this case, it is preferable to increase the engine torque Te temporarily, and then reduce the engine torque Te in the required amount of change ΔTe_ref. That is, it is preferable to select the prime mover whose torque is adjusted to increase a difference from the limit value by the counter torque, based on the output torque, the required amount of change, and the limit value of the torque.

Figure 3:
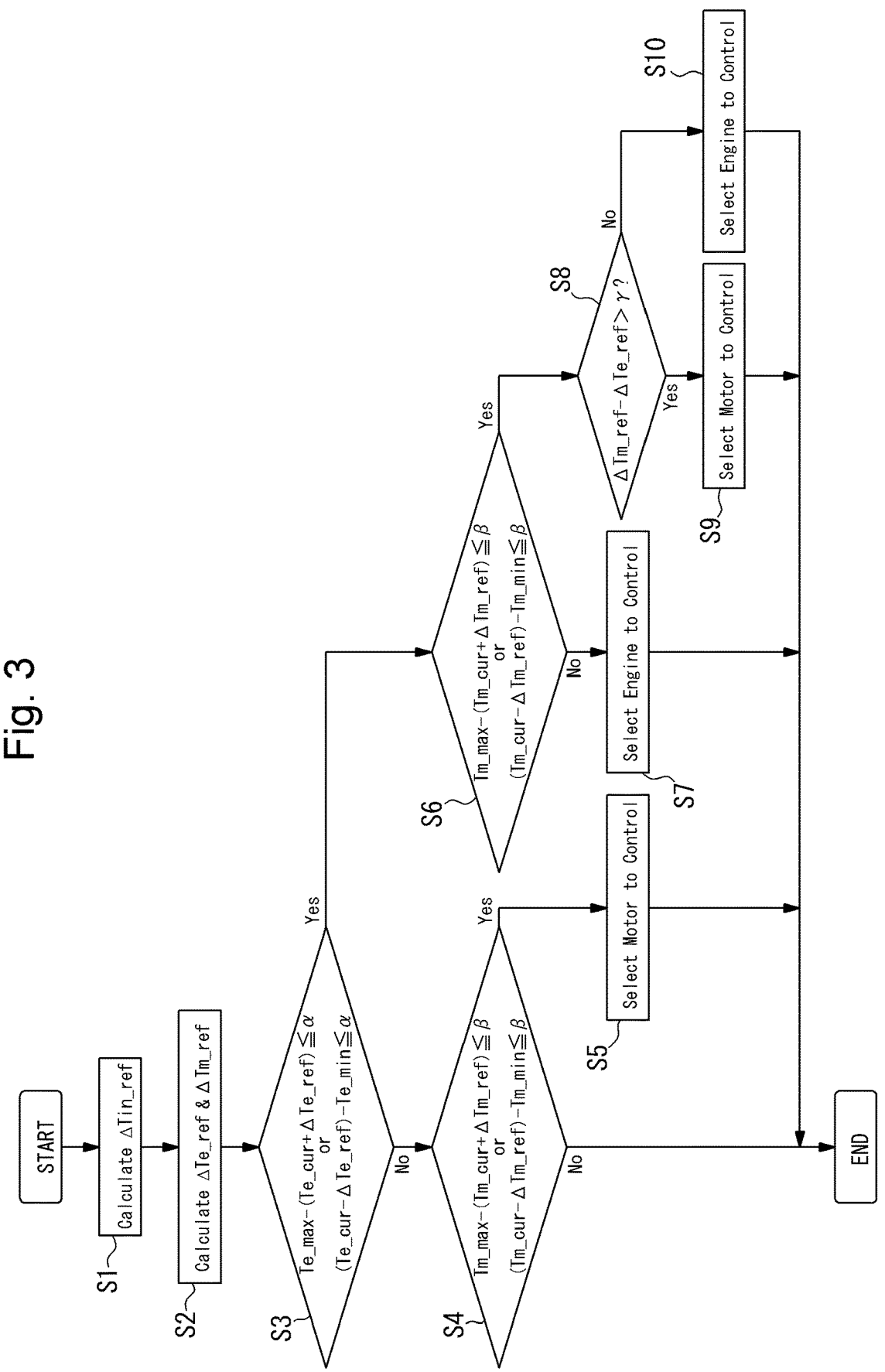
FIG. 3 is a flowchart showing one example of a routine to select the prime mover to be controlled to adjust an output torque thereof by a counter torque.

Turning to FIG. 3, there is shown one example of a routine to select the prime mover whose torque is adjusted by the counter torque. At step S1, the required amount of change ΔTin_ref of the input torque Tin to the clutch device 8 is calculated. To this end, for example, a period of time to change the input torque Tin is calculated based on an allowable period of time to execute a speed change operation of the rear transmission 9. Then, a rate of change of an input speed to the clutch device 8 is calculated based on the calculated period of time to change the input torque Tin, and a required amount of change in the input speed to the clutch device 8 to execute the speed change operation. Further, the input torque Tin to the clutch device 8 is calculated such that the actual input speed to the clutch device 8 is changed at the calculated rate, based on inertia torques of rotary members connected to an input element of the clutch device 8 such as the engine 1 and the rear motor 2. Thereafter, the required amount of change ΔTin_ref of the input torque Tin is calculated based on the calculated input torque Tin, and a current input torque Tin_cur (before executing the speed change operation) to the clutch device 8.

Then, at step S2, the required amount of change ΔTe_ref of the engine torque Te and the required amount of change ΔTm_ref of the motor torque Tm to change the input torque Tin in the required amount of change ΔTin_ref calculated at step S1 are calculated respectively. For example, the required amount of change ΔTe_ref of the engine torque Te may be set to a value at which a fuel efficiency of the engine 1 will not be reduced, and the required amount of change ΔTm_ref of the motor torque Tm may be set to a difference between the required amount of change ΔTe_ref of the engine torque Te and the required amount of change ΔTin_ref of the input torque Tin. Instead, in a case that the required amount of change ΔTin_ref of the input torque Tin has to be increased to execute a downshifting and that the SOC level of the electric storage device is higher than a predetermined level, the required amount of change ΔTe_ref of the engine torque Te may be set to zero, and the required amount of change ΔTm_ref of the motor torque Tm may be set to the required amount of change ΔTin_ref of the input torque Tin.

Thereafter, it is determined at step S3 whether the engine torque Te will be changed further than an upper limit value Te_max or a lower limit value Te_min given that a current engine torque Te_cur before executing the speed change operation of the rear transmission 9 is changed in the required amount of change ΔTe_ref. At step S3, specifically, it is determined whether following inequalities (1) and (2) are satisfied.

$$Te\_max - (Te\_cur + \Delta Te\_ref) \leq \alpha \quad (1)$$

$$(Te\_cur - \Delta Te\_ref) - Te\_min \leq \alpha \quad (2)$$

For example, the upper limit value Te_max in the above inequality (1) may be set to an upper limit value of the output torque of the engine 1 governed by a capacity of the engine 1, or an upper limit value of the output torque Te of the engine 1 possible to be generated by the engine 1 without activating the supercharger C. On the other hand, for example, the lower limit value Te_min in the above inequality (2) may be set to: a lowest value of the output torque Te of the engine 1 reduced by stopping fuel supply while closing a throttle valve; a threshold value of the output torque Te of the engine 1 to inactivate the supercharger C; or a lowest value of the output torque Te of the engine 1 possible to maintain a self-sustaining speed of the engine 1. In addition, in the above inequalities (1) and (2), $\alpha$ is a threshold value which is set taking account of variation in the engine torque Te and so on.

If the engine torque Te will not be changed further than the upper limit value Te_max or the lower limit value Te_min even if the current engine torque Te_cur is changed in the required amount of change $\Delta Te\_ref$ so that the answer of step S3 is NO, the routine progresses to step S4. At step S4, it is determined whether the motor torque Tm will be changed further than an upper limit value Tm_max or a lower limit value Tm_min given that a current motor torque Tm_cur before executing the speed change operation of the rear transmission 9 is changed in the required amount of change $\Delta Tm\_ref$. At step S4, specifically, it is determined whether following inequalities (3) or (4) are satisfied.

$$Tm\_max - (Tm\_cur + \Delta Tm\_ref) \leq \beta \quad (3)$$

$$(Tm\_cur - \Delta Tm\_ref) - Tm\_min \leq \beta \quad (4)$$

For example, the upper limit value Tm_max in the above inequality (3) may be set to an upper limit value of the output torque Tm of the rear motor 2 governed by a capacity of the rear motor 2 and temperatures of the electric storage device and the inverter. On the other hand, for example, the lower limit value Tm_min in the above inequality (4) may be set to: a lowest value of the output torque Tm of the rear motor 2 governed by a capacity of the rear motor 2 and temperatures of the electric storage device and the inverter. In addition, in the above inequalities (3) and (4), $\beta$ is a threshold value which is set taking account of variation in the motor torque Tm and so on.

If the motor torque Tm will not be changed further than the upper limit value Tm_max or the lower limit value Tm_min even if the current motor torque Tm_cur is changed in the required amount of change $\Delta Tm\_ref$ so that the answer of step S4 is NO, the routine returns. That is, in this case, none of the engine torque Te and the motor torque Tm will not be changed further than the upper limit value and the lower limit value. In this case, therefore, the engine torque Te is changed in the required amount of change $\Delta Te\_ref$, and the motor torque Tm is changed in the required amount of change $\Delta Tm\_ref$. That is, it is not necessary to add the counter torque to the engine torque Te and the motor torque Tm in this case, and hence the routine returns.

By contrast, if the motor torque Tm is expected to be changed further than the upper limit value Tm_max or the lower limit value Tm_min as a result of changing the current motor torque Tm_cur in the required amount of change $\Delta Tm\_ref$ so that the answer of step S4 is YES, the routine progresses to step S5 to add the counter torque $\Delta Tm\_opp$ to the motor torque Tm. In other words, the rear motor 2 is selected to be controlled to adjust the motor torque Tm thereof by the counter torque $\Delta Tm\_opp$.

Otherwise, if the engine torque Te is expected to be changed further than the upper limit value Te_max or the lower limit value Te_min as a result of changing the current engine torque Te_cur in the required amount of change $\Delta Te\_ref$ so that the answer of step S3 is YES, the routine progresses to step S6. At step S6, as the foregoing step S4, it is also determined whether the motor torque Tm will be changed further than the upper limit value Tm_max or the lower limit value Tm_min given that the current motor torque Tm_cur is changed in the required amount of change $\Delta Tm\_ref$. If the motor torque Tm will not be changed further than the upper limit value Tm_max or the lower limit value Tm_min even if the current motor torque Tm_cur is changed in the required amount of change $\Delta Tm\_ref$ so that the answer of step S6 is NO, the routine progresses to step S7 to add a counter torque $\Delta Te\_opp$ to the engine torque Te. In other words, the engine 1 is selected to be controlled to adjust the engine torque Te thereof by the counter torque $\Delta Te\_opp$. Thereafter, the routine returns.

By contrast, if the motor torque Tm is expected to be changed further than the upper limit value Tm_max or the lower limit value Tm_min as a result of changing the current motor torque Tm_cur in the required amount of change $\Delta Tm\_ref$ so that the answer of step S6 is YES, the routine progresses to step S8. In this case, both of the engine torque Te and the motor torque Tm will be changed further than the upper limit value or the lower limit value. In this case, therefore, one of the engine 1 and the rear motor 2 whose required amount of change in the output torque is greater is selected to be controlled to adjust the output torque thereof by the counter torque, and the output torque of the other one of the engine 1 and the rear motor 2 will not be adjusted by the counter torque.

At step S8, specifically, it is determined whether the required amount of change $\Delta Tm\_ref$ of the motor torque Tm is greater than the required amount of change $\Delta Te\_ref$ of the engine torque Te. If the required amount of change $\Delta Tm\_ref$ of the motor torque Tm is greater than the required amount of change $\Delta Te\_ref$ of the engine torque Te so that the answer of step S8 is YES, the routine progresses to step S9 to add the counter torque $\Delta Tm\_opp$ to the motor torque Tm. In other words, the rear motor 2 is selected to be controlled to adjust the motor torque Tm thereof by the counter torque $\Delta Tm\_opp$. Thereafter, the routine returns. By contrast, if the required amount of change $\Delta Te\_ref$ of the engine torque Te is greater than the required amount of change $\Delta Tm\_ref$ of the motor torque Tm so that the answer of step S8 is NO, the routine progresses to step S10 to add the counter torque $\Delta Te\_opp$ to the engine torque Te. In other words, the engine 1 is selected to be controlled to adjust the engine torque Te thereof by the counter torque $\Delta Te\_opp$. Thereafter, the routine returns. Here, $\gamma$ employed at step S8 is a threshold value, and the threshold value $\gamma$ may be set to zero.

Thus, one of the engine 1 and the rear motor 2 is selected to add the counter torque to the output torque thereof so as to increase the difference from e.g., the lower limit value of the output torque as shown in FIG. 2. According to the exemplary embodiment of the present disclosure, therefore, the output torque of the selected prime mover may be changed within the upper limit value and the limit value in the required amount of change without restriction. For this reason, the input torque Tin to the clutch device 8 may be changed certainly in the required amount of change $\Delta Tin\_ref$.

In addition, in the case that both of the engine torque Te and the motor torque Tm are expected to be changed further than the upper limit value or the lower limit value as a result of changing those torques in the required amounts, one of the engine 1 and the rear motor 2 whose required amount of change in the output torque is greater is selected to adjust the output torque thereof by the counter torque. For example, such situation may occur when the required amounts of change in the output torques of the engine 1 and the rear motor 2 are large to complete a speed change operation of the rear transmission 9 promptly, or to ensure a drive torque to propel the vehicle Ve. Therefore, the speed change operation of the rear transmission 9 may be completed promptly and the drive torque to propel the vehicle Ve can be ensured after the completion of the speed change operation by adjusting the output torque of one of the engine 1 and the rear motor 2 required to be changed more significantly by the counter torque.

Thus, in the case that both of the engine torque Te and the motor torque Tm are expected to be changed further than the upper limit value or the lower limit value as a result of changing those torques in the required amounts, the output torque of one of the engine 1 and the rear motor 2 required to be changed more significantly is adjusted by the counter torque. In this case, an actual amount of change in the output torque of the other one of the engine 1 and the rear motor 2 whose required amount of change is smaller may be increased. However, the output torque of the other one of the engine 1 and the rear motor 2 whose required amount of change is smaller may have to be changed preferentially in the required amount, rather than changing the output torque of said one of the engine 1 and the rear motor 2 whose required amount of change is larger in the required amount. In this case, a response of the speed change operation of the rear transmission 9 may be reduced, and a required acceleration of the vehicle Ve may not be achieved. In order to avoid such disadvantages, the drive force control system according to the exemplary embodiment is further configured to select the prime mover that is required to change the output torque preferentially to adjust the output torque thereof by the counter torque. To this end, the drive force control system executes the routine shown in FIG. 4. In the following explanations of FIG. 4, detailed explanations for the steps in common with those of the routine shown in FIG. 3 will be omitted.

Figure 4:
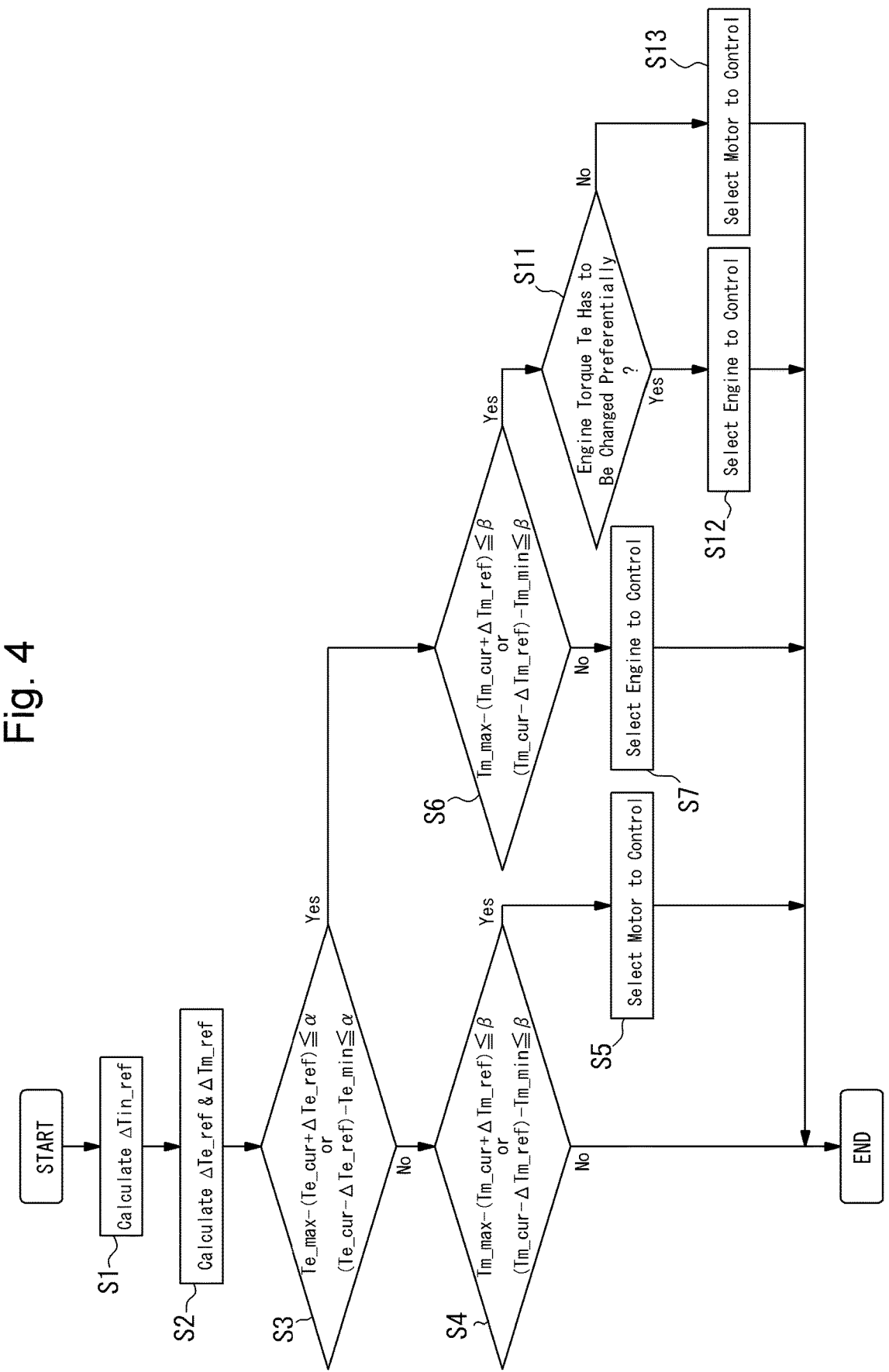
FIG. 4 is a flowchart showing another example of the routine to select the prime mover to be controlled to adjust the output torque thereof by the counter torque.

According to the routine shown in FIG. 4, in the case that the answer of step S6 is YES, the routine progresses to step S11 to determine whether it is necessary to preferentially create a margin of the engine torque Te to change the engine torque Te in the required amount of change ΔTe_ref, so as to ensure the drive force to propel the vehicle Ve as much as possible. For example, in a case that the required drive force to propel the vehicle Ve is expected to be increased, it is necessary to increase a difference between the current engine torque Te_cur and the upper limit value Te_max of the engine torque Te. To this end, the margin of the engine torque Te to increase the drive force has to be increased as much as possible. In this case, therefore, the answer of step S11 will be YES. By contrast, in a case that the required drive force to propel the vehicle Ve has to be reduced promptly, it is necessary to increase a difference between the current motor torque Tm_cur and the lower limit value Tm_min of the motor torque Tm. To this end, the margin of the motor torque Tm to reduce the drive force has to be increased as much as possible. In this case, therefore, the answer of step S11 will be NO.

If it is necessary to preferentially create the margin of the engine torque Te so that the answer of step S11 is YES, the routine progresses to step S12 to add the counter torque ΔTe_opp to the engine torque Te. In other words, the engine 1 is selected to be controlled to adjust the engine torque Te thereof by the counter torque ΔTe_opp. Thereafter, the routine returns. By contrast, if it is not necessary to preferentially create the margin of the engine torque Te, in other words, if it is necessary to preferentially create a margin of the motor torque Tm so that the answer of step S11 is NO, the routine progresses to step S13 to add the counter torque ΔTm_opp to the motor torque Tm. In other words, the rear motor 2 is selected to be controlled to adjust the motor torque Tm thereof by the counter torque ΔTm_opp. Thereafter, the routine returns.

By executing the routine shown in FIG. 4, the required drive force to propel the vehicle Ve can be ensured as much as possible and the speed change operation can be executed as quickly as possible, even if both of the engine torque Te and the motor torque Tm is expected to be changed further than the limit values.

Thus, by executing the routines shown in FIG. 3 or 4, one of the engine 1 and the rear motor 2 is selected to be controlled to adjust the output torque thereof preferentially in the required amount of change.

For example, the upper limit value Tm_max or the lower limit value Tm_min of the motor torque Tm may be set to a value at which the SOC level of the electric storage device is restricted within a desirable range. In this case, the motor torque Tm may be allowed to be changed further than the upper limit value Tm_max or the lower limit value Tm_min temporarily. Likewise, the upper limit value Te_max or the lower limit value Te_min of the engine torque Te may be set to a level at which a reduction in the fuel efficiency is prevented. In this case, the engine torque Te may be allowed to be changed further than the upper limit value Te_max or the lower limit value Te_min temporarily. In those cases, the counter torque may be added to the output torque of one of the engine 1 and the rear motor 2 whose output torque is not allowed to be changed further than the limit value so that the output torque will not be changed further than the limit value. On the other hand, the output torque of the other one of the engine 1 and the rear motor 2 whose output torque is allowed to be changed further than the limit value may be changed further than the limit value temporarily to achieve the required amount of change ΔTin_ref of the input torque Tin to the clutch device 8. Consequently, both of the output torques of the engine 1 and the rear motor 2 may be changed in the required amounts of change.

To this end, the drive force control system according to the exemplary embodiment is further configured to add the counter torque to the output torque of one of the engine 1 and the rear motor 2 whose output torque is not allowed to be changed further than the limit value. Specifically, the drive force control system executes the routine shown in FIG. 5. In the following explanations of FIG. 5, detailed explanations for the steps in common with those of the foregoing routines will be omitted. According to the routine shown in FIG. 5, in the case that the answer of step S6 is YES, the routine progresses to step S14 to determine whether the output torque of one of the engine 1 and the rear motor 2 is allowed to be changed further than the limit value. If the output torque of none of the engine 1 and the rear motor 2 is allowed to be changed further than the limit value so that the answer of step S14 is NO, one of the engine 1 and the rear motor 2 is selected to be controlled to adjust the output torque thereof by the counter torque by the procedures of the step S8 of the routine shown in FIG. 3 or the procedures of the step S11 of the routine shown in FIG. 4. Here, in FIG. 5, the routine returns in this case for the sake of illustration.

By contrast, if the output torque of at least any one of the engine 1 and the rear motor 2 is/are allowed to be changed further than the limit value so that the answer of step S14 is YES, the routine progresses to step S15 to select one of the engine 1 and the rear motor 2 whose output torque is not allowed to be changed further than the limit value and to adjust the output torque of the selected prime mover by the counter torque. Thereafter, the routine returns. Here, if the output torques of both of the engine 1 and the rear motor 2 are allowed to be changed further than the limit values so that the answer of step S14 is YES, one of the engine 1 and the rear motor 2 may be selected to be controlled to adjust the output torque thereof by the counter torque by the procedures of the step S8 of the routine shown in FIG. 3 or the procedures of the step S11 of the routine shown in FIG. 4.

Thus, the counter torque may be added to the output torque of one of the engine 1 and the rear motor 2 whose output torque is not allowed to be changed further than the limit value so that the output torque will not be changed further than the limit value. On the other hand, the output torque of the other one of the engine 1 and the rear motor 2 whose output torque is allowed to be changed further than the limit value may be changed further than the limit value temporarily to achieve the required amount of change $\Delta Tin\_ref$ of the input torque Tin to the clutch device 8.

After selecting one of the engine 1 and the rear motor 2 to be controlled to adjust the output torque thereof by the counter torque by executing at least one of the routines shown in FIGS. 3 to 5, the counter torque to be applied to the output torque of the selected one of the engine 1 and the rear motor 2 (as will be simply called the "selected prime mover" hereinafter) and the adjuster torque to be applied to the output torque of the other one of the engine 1 and the rear motor 2 (as will be simply called the "other prime mover" hereinafter) are calculated by the procedures shown in FIG. 6. First of all, at step S21, a required amount of change $\Delta Ta\_ref$ of an output torque Ta of the selected prime mover is calculated by the same procedure as the foregoing step S2 of the routine shown in e.g., FIG. 3. Specifically, one of the required amount of change $\Delta Te\_ref$ of the engine torque Te and the required amount of change $\Delta Tm\_ref$ of the motor torque Tm calculated at step S2 is employed as the required amount of change $\Delta Ta\_ref$ of an output torque Ta of the selected prime mover.

Then, the routine progresses to at step S22 to calculate a provisional value $\Delta Ta\_opp\_1$ of the counter torque $\Delta Ta\_opp$ necessary to be added to the output torque Ta of the selected prime mover in order not to change the output torque Ta further than an upper limit value Ta_max or a lower limit value Ta_min, given that the output torque Ta is changed in the required amount of change $\Delta Ta\_ref$. Specifically, the provisional value $\Delta Ta\_opp\_1$ is calculated based on an exceedance of the output torque Ta of the selected prime mover from the limit value using the following formulas (5) or (6).

$$\Delta Ta\_opp\_1: (Ta\_cur + \Delta Ta\_ref) - Ta\_max \quad (5)$$

$$\Delta Ta\_opp\_1: Ta\_min - (Ta\_cur - \Delta Ta\_ref) \quad (6)$$

In the above formulas (5) and (6), Ta_cur is a current output torque Ta of the selected prime mover before executing the speed change operation of the rear transmission 9, Ta_max is an upper limit value of the output torque Ta of the selected prime mover, and Ta_min is a lower limit value of the output torque Ta of the selected prime mover. Specifically, the current output torque Ta_cur, the upper limit value Ta_max, and the lower limit value Ta_min may be calculated by the same procedures to calculate Te_cur, Tm_cur, Te_max, Tm_max, Te_min, and Tm_min at steps S3, S4, and S6 of the foregoing routines shown in FIGS. 3 to 5.

Then, at step S23, the counter torque $\Delta Ta\_opp$ to be added to the output torque Ta of the selected prime mover is set to the provisional value $\Delta Ta\_opp\_1$ calculated at step S22, and an adjuster torque $\Delta Tb\_adj$ to be added to the output torque Tb of the other prime mover is set to same magnitude as the counter torque $\Delta Ta\_opp$. Thereafter, the routine returns.

By adding the counter torque $\Delta Ta\_opp$ to the output torque Ta of the selected prime mover and adding the adjuster torque $\Delta Tb\_adj$ to the output torque Tb of the other prime mover, the output torque Ta of the selected prime mover will not be changed further than the upper limit value Ta_max or the lower limit value Ta_min, given that the output torque Ta is changed in the required amount of change $\Delta Ta\_ref$. In addition, since the adjuster torque $\Delta Tb\_adj$ of same magnitude as the counter torque $\Delta Ta\_opp$ is added to the output torque Tb of the other prime mover, the input torque Tin to the clutch device 8 will not be changed even if the counter torque $\Delta Ta\_opp$ is added to the output torque Ta of the selected prime mover.

The above-mentioned adjuster torque $\Delta Tb\_adj$ is added to the output torque Tb of the other prime mover in the same direction as the direction to change the output torque Tb in the required amount of change. Consequently, an amount of change in the output torque Tb of the other prime mover will be increased as a result of executing the speed change operation of the rear transmission 9, as compared to a case in which the adjuster torque $\Delta Tb\_adj$ is not added to the output torque Tb. For example, given that the engine 1 is the other prime mover, the engine torque Te may be changed further than the upper limit value Te_max or the lower limit value Te_min as a result of adding the adjuster torque $\Delta Te\_adj$ to the engine torque Te, even if the answer of step S3 is NO. In this case, the engine torque Te may be changed within a range between the lower limit value Te_min and the upper limit value Te_max after adding the adjuster torque $\Delta Te\_adj$ to the engine torque Te. That is, the output torque of the other prime mover may be changed within a range less than the required amount of change thereof.

Figure 5:
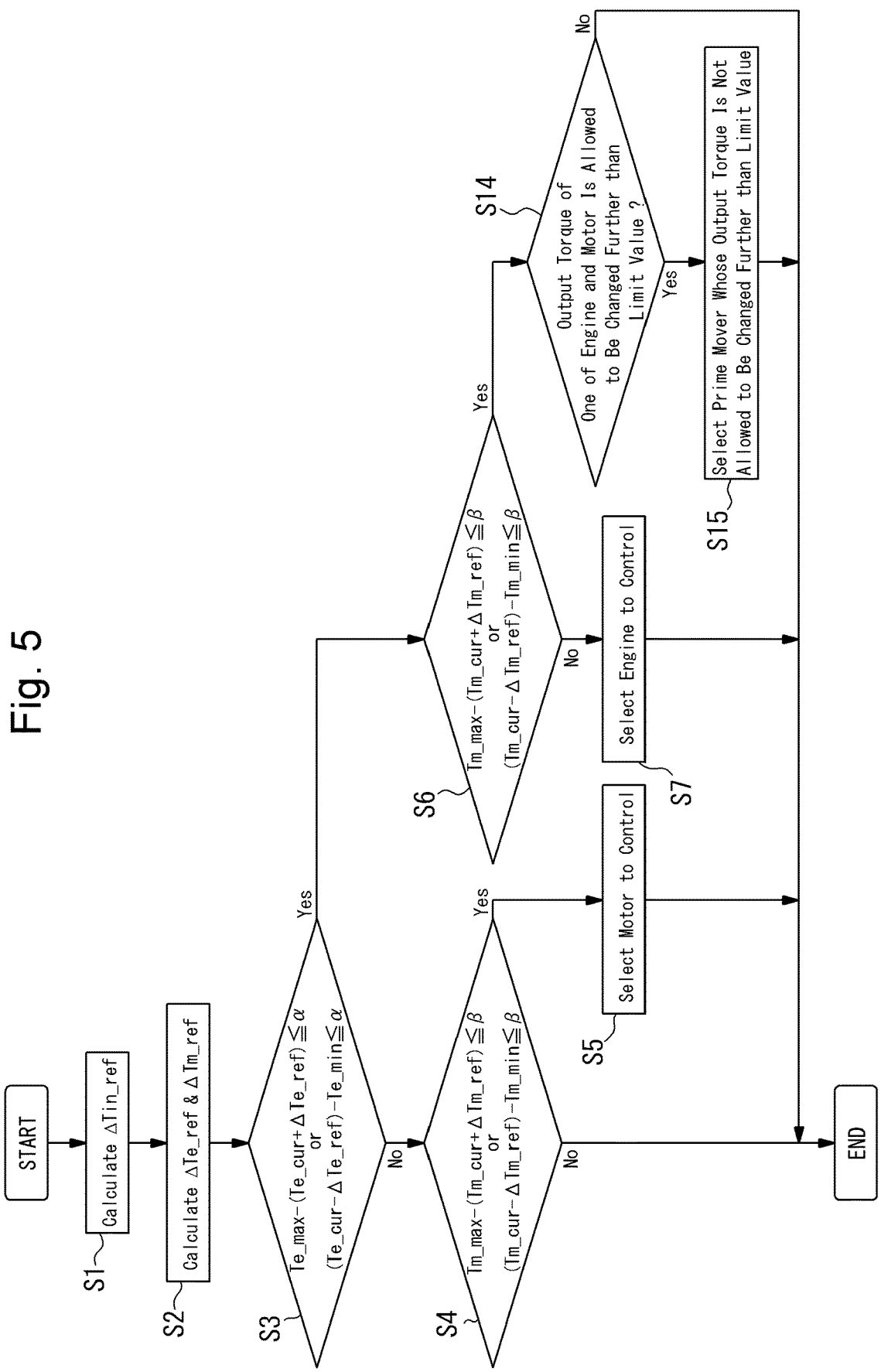
FIG. 5 is a flowchart showing still another example of the routine to select the prime mover to be controlled to adjust the output torque thereof by the counter torque.
Figure 6:
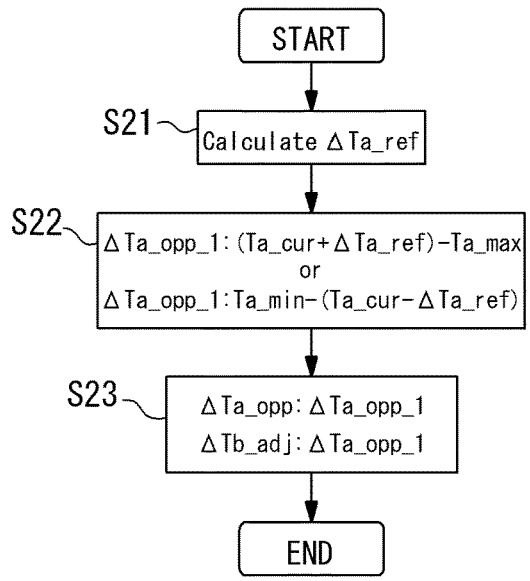
FIG. 6 is a flowchart showing one example of a routine to calculate the counter torque and an adjuster torque.

If the output torque Tb is changed further than the upper limit value Tb_max or the lower limit value Tb_min as a result of changing the output torque Tb of the other prime mover in the required amount of change after adding the adjuster torque $\Delta Tb\_adj$ to the output torque Tb, step S8 of the routine shown in FIG. 3, step S11 of the routine shown in FIG. 4, or step S14 of the routine shown in FIG. 5 may be executed to select the prime mover again. Specifically, after selecting the engine 1 or the rear motor 2 to adjust the output torque thereof by the counter torque, it is determined whether the output torque of the "other prime mover" whose output torque is adjusted by the adjuster torque will be changed further than the upper limit value or the lower limit value given that the output torque thereof is changed in the required amount. If the output torque of the other prime mover is expected to be changed further than the upper limit value or the lower limit value, the routine progresses to step S8 of the routine shown in FIG. 3, step S11 of the routine shown in FIG. 4, or step S14 of the routine shown in FIG. 5.

In this case, the adjuster torque to be added to the output torque of the other prime mover may be adjusted within a range less than the limit value. In other words, the counter torque to be added to the output torque of the selected prime mover may be reduced. To this end, the drive force control system according to the exemplary embodiment of the present disclosure is further configured to execute the routine shown in FIG. 7. In the following explanations of FIG. 7, detailed explanations for the steps in common with those of the foregoing routines will be omitted.

Figure 7:
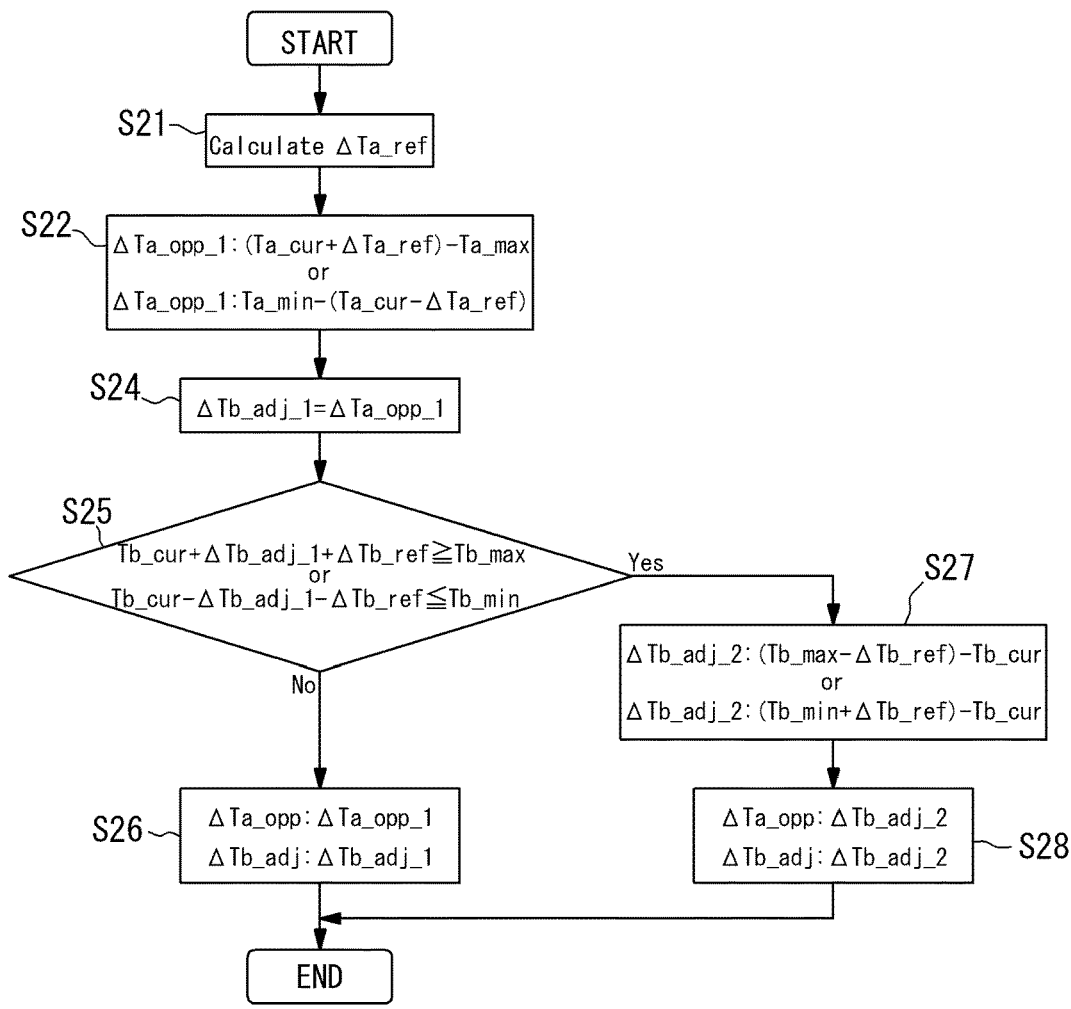
FIG. 7 is a flowchart showing one example of a routine to correct the adjuster torque.

According to the routine shown in FIG. 7, after calculating the provisional value $\Delta Ta\_opp\_1$ of the counter torque $\Delta Ta\_opp$ to be added to the output torque Ta of the selected prime mover at step S22, the routine progresses to step S24 to set a first provisional value $\Delta Tb\_adj\_1$ of the adjuster torque $\Delta Tb\_adj$ to be added to the output torque Tb of the other prime mover to same magnitude as the provisional value $\Delta Ta\_opp\_1$. Then, it is determined at step S25 whether the output torque Tb of the other prime mover will be changed further than an upper limit value Tb_max or a lower limit value Tb_min, given that the first provisional value $\Delta Tb\_adj\_1$ of the adjuster torque $\Delta Tb\_adj$ is added to (or subtracted from) a current output torque Tb_cur of the other prime mover before executing the speed change operation of the rear transmission 9, and that the current output torque Tb_cur adjusted by the first provisional value $\Delta Tb\_adj\_1$ is changed in a required amount of change $\Delta Tb\_ref$. At step S25, specifically, it is determined whether following inequalities (7) or (8) are satisfied.

$$\Delta Tb\_cur + \Delta Tb\_adj\_1 + \Delta Tb\_ref \geq Tb\_max \quad (7)$$

$$\Delta Tb\_cur - \Delta Tb\_adj\_1 - \Delta Tb\_ref \leq Tb\_min \quad (8)$$

If the output torque Tb will not be changed further than the upper limit value Tb_max or the lower limit value Tb_min so that the answer of step S25 is NO, the routine progresses to step S26. At step S26, the counter torque $\Delta Ta\_opp$ to be added to the output torque Ta of the selected prime mover is set to the provisional value $\Delta Ta\_opp\_1$ calculated at step S22, and the adjuster torque $\Delta Tb\_adj$ to be added to the output torque Tb of the other prime mover is set to the first provisional value $\Delta Tb\_adj\_1$ set at step S24. Thereafter, the routine returns.

By contrast, if the output torque Tb is expected to be changed further than the upper limit value Tb_max or the lower limit value Tb_min so that the answer of step S25 is YES, the routine progresses to step S27 to calculate a second provisional value $\Delta Tb\_adj\_2$ of the adjuster torque $\Delta Tb\_adj$ that will not change the output torque Tb of the other prime mover further than the upper limit value Tb_max or the lower limit value Tb_min. Specifically, the second provisional value $\Delta Tb\_adj\_2$ is calculated using the following formulas (9) or (10).

$$\Delta Tb\_adj\_2 : (\Delta Tb\_max - \Delta Tb\_ref) - Tb\_cur \quad (9)$$

$$\Delta Tb\_adj\_2 : (\Delta Tb\_min + \Delta Tb\_ref) - Tb\_cur \quad (10)$$

Thereafter, at step S28, the counter torque $\Delta Ta\_opp$ to be added to the output torque Ta of the selected prime mover is set to the second provisional value $\Delta Tb\_adj\_2$, and the adjuster torque $\Delta Tb\_adj$ to be added to the output torque Tb of the other prime mover is also set to the second provisional value $\Delta Tb\_adj\_2$. Thereafter, the routine returns.

Consequently, the counter torque $\Delta Ta\_opp$ and the adjuster torque $\Delta Tb\_adj$ are corrected in such a manner that the output torque Tb of the other prime mover will not be changed further than the upper limit value Tb_max or the lower limit value Tb_min. In addition, even if the required amount of change $\Delta Ta\_ref$ in the output torque Ta of the selected prime mover is set such that the output torque Ta will not be changed further than the upper limit value Ta_max or the lower limit value Ta_min, the counter torque $\Delta Ta\_opp$ is added to the output torque Ta. Therefore, even if the required amount of change $\Delta Ta\_ref$ may not be achieved, a difference between the required amount of change $\Delta Ta\_ref$ and an actual amount of change in the output torque Ta of the selected prime mover may be reduced.

Figure 8:
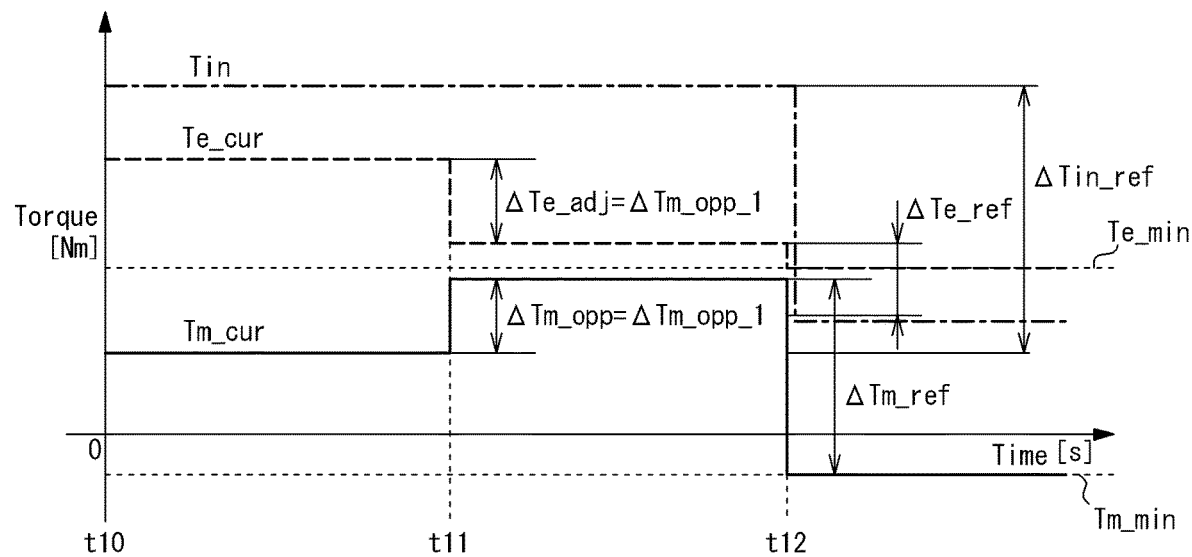
FIG. 8 is a time chart showing temporal changes in an engine torque and a motor torque in a case that the engine torque and the motor torque are not allowed to be changed further than lower limit values, and that a rear motor is selected to be controlled to adjust the output torque thereof by the counter torque.

Next, temporal changes in the engine torque Te and the motor torque Tm during execution of the routines shown in FIGS. 3 to 7 will be explained with reference to FIGS. 8 to 12. Turning to FIG. 8, there is shown an example in which the engine torque Te and the motor torque Tm are not allowed to be reduced further than the lower limit values Te_min and Tm_min respectively, and in which the rear motor 2 is selected to be controlled to adjust the motor torque Tm thereof by the counter torque $\Delta Tm\_opp$. In the example shown in FIG. 8, the rear motor 2 is selected to be controlled to adjust the motor torque Tm thereof by the counter torque $\Delta Tm\_opp$ due to the fact that the required amount of change $\Delta Tm\_ref$ of the motor torque Tm is greater than the required amount of change $\Delta Te\_ref$ of the engine torque Te, or that a margin of the motor torque Tm to change the motor torque Tm in the required amount of change $\Delta Tm\_ref$ has to be created preferentially. In FIGS. 8 to 12, the motor torque Tm is indicated by the solid line, the engine torque Te is indicated by the dashed line, and the input torque Tin to the clutch device 8 is indicated by the dashed-dotted line.

In the example shown in FIG. 8, the input torque Tin to the clutch device 8 as a synthesized torque of the output torque Te of the engine 1 and the output torque Tm of the rear motor 2 is maintained to a constant value from point t10. A condition to execute an upshifting of the rear transmission 9 is satisfied at point t11, and hence the input torque Tin is expected to be reduced. In this situation, therefore, the counter torque $\Delta Tm\_opp$ calculated such that the motor torque Tm will not be reduced further than the lower limit value Tm_min is added to the current motor torque Tm_cur of the rear motor 2. Consequently, the motor torque Tm is increased. At the same time, the adjuster torque $\Delta Te\_adj$ is added to the engine torque Te to maintain the input torque Tin even after adding the counter torque $\Delta Tm\_opp$ to the current motor torque Tm_cur. Consequently, the engine torque Te is reduced. At point t12, the motor torque Tm thus increased by the counter torque $\Delta Tm\_opp$ is reduced in the required amount of change $\Delta Tm\_ref$. As described, according to the example shown in FIG. 8, the engine torque Te is not allowed to be reduced further than the lower limit value Te_min. In this situation, therefore, the engine torque Te reduced by the adjuster torque $\Delta Te\_adj$ is further reduced to an extent not to exceed the lower limit value Te_min.

According to the example shown in FIG. 8, therefore, the motor torque Tm may be reduced in the required amount of change $\Delta Tm\_ref$ without exceeding the lower limit value Tm_min.

Figure 9:
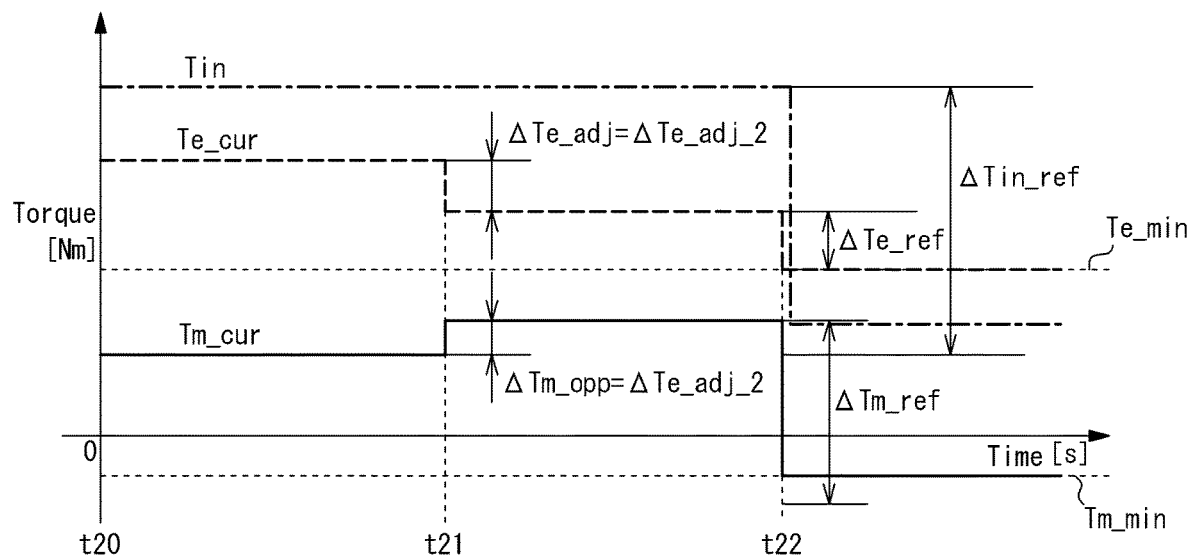
FIG. 9 is a time chart showing temporal changes in the engine torque and the motor torque in a case that the engine torque and the motor torque are not allowed to be changed further than lower limit values, that the rear motor is selected to be controlled to adjust the output torque thereof by the counter torque, and that a margin of the engine torque to change the engine torque in the required amount of change is created preferentially.

FIG. 9 shows an example in which the engine torque Te and the motor torque Tm are not allowed to be reduced further than the lower limit values Te_min and Tm_min respectively, and in which the rear motor 2 is selected to be controlled to adjust the motor torque Tm thereof by the counter torque $\Delta Tm\_opp$. In the example shown in FIG. 9, the rear motor 2 is selected to be controlled to adjust the motor torque Tm thereof by the counter torque $\Delta Tm\_opp$ due to the fact that the required amount of change $\Delta Tm\_ref$ of the motor torque Tm is greater than the required amount of change ΔTe_ref of the engine torque Te, and a margin of the engine torque Te to change the engine torque Te in the required amount of change ΔTe_ref has to be created preferentially.

In the example shown in FIG. 9, the input torque Tin to the clutch device 8 as a synthesized torque of the output torque Te of the engine 1 and the output torque Tm of the rear motor 2 is maintained to a constant value from point t20. The condition to execute an upshifting of the rear transmission 9 is satisfied at point t21, and hence the input torque Tin is expected to be reduced. In this situation, given that the counter torque ΔTm_opp calculated such that the motor torque Tm will not be reduced further than the lower limit value Tm_min is added to the current motor torque Tm_cur and the engine torque Te is reduced by the adjuster torque ΔTe_adj corresponding to the counter torque ΔTm_opp, and that the engine torque Te is further reduced in the required amount of change ΔTe_ref, the engine torque Te will be reduced further than the lower limit value Te_min. According to the example shown in FIG. 9, therefore, the counter torque ΔTm_opp and the adjuster torque ΔTe_adj are corrected by the procedures shown in FIG. 7 in such a manner that the engine torque Te will not be reduced further than the lower limit value Te_min. The corrected counter torque ΔTm_opp_1 is added to the current motor torque Tm_cur to increase the motor torque Tm, and the corrected adjuster torque ΔTe_adj is added to the current engine torque Te_cur to reduce the engine torque Te. At point t22, in order to reduce the input torque Tin to the clutch device 8, the motor torque Tm thus increased by the corrected counter torque ΔTm_opp_1 is reduced within a range higher than the lower limit value Te_min, and the engine torque Te thus reduced by the corrected adjuster torque ΔTe_adj is further reduced in the required amount of change ΔTe_ref.

According to the example shown in FIG. 9, therefore, the motor torque Tm may be reduced in the required amount of change ΔTm_ref without reducing the engine torque Te further than the lower limit value Te_min.

Figure 10:
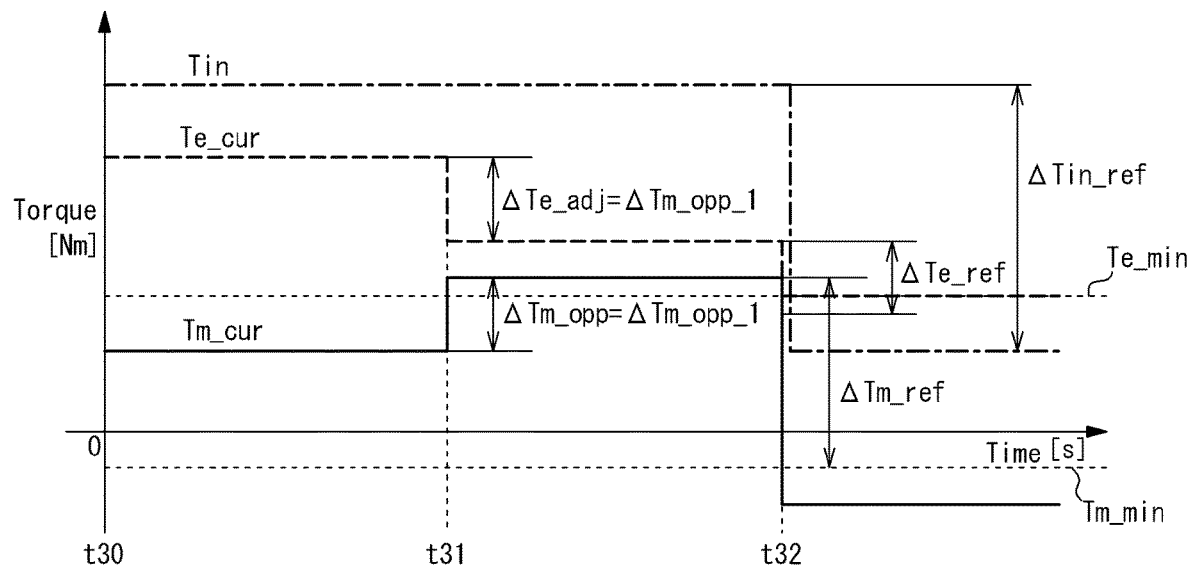
FIG. 10 is a time chart showing temporal changes in the engine torque and the motor torque in a case that the motor torque is allowed to be changed further than the lower limit value but the engine torque is not allowed to be reduced further than the lower limit value.

FIG. 10 shows an example in which the motor torque Tm is allowed to be reduced further than the lower limit value Tm_min, but the engine torque Te is not allowed to be reduced further than the lower limit value Te_min. In the example shown in FIG. 10, the rear motor 2 is selected to be controlled to adjust the motor torque Tm thereof by the counter torque ΔTm_opp due to the fact that the required amount of change ΔTm_ref of the motor torque Tm is greater than the required amount of change ΔTe_ref of the engine torque Te.

In the example shown in FIG. 10, the input torque Tin to the clutch device 8 as a synthesized torque of the output torque Te of the engine 1 and the output torque Tm of the rear motor 2 is maintained to a constant value from point t30. The condition to execute an upshifting of the rear transmission 9 is satisfied at point t31 and hence the input torque Tin is expected to be reduced. In this situation, therefore, the counter torque ΔTm_opp calculated such that the motor torque Tm will not be reduced further than the lower limit value Tm_min is added to the current motor torque Tm_cur of the rear motor 2, and at the same time, the engine torque Te is reduced by the adjuster torque ΔTe_adj to maintain the input torque Tin even after adding the counter torque ΔTm_opp to the current motor torque Tm_cur. Then, the input torque Tin is reduced at point t32.

According to the example shown in FIG. 10, the motor torque Tm is allowed to be reduced further than the lower limit value Tm_min, therefore, the engine torque Te is reduced within a range higher than the lower limit value Te_min, and the motor torque Tm is reduced in an amount possible to achieve the required amount of change ΔTin_ref of the input torque Tin. To this end, an amount of reduction in the engine torque Te below the lower limit value Te_min after reducing by the adjuster torque ΔTe_adj and further reducing in the required amount of change ΔTe_ref is calculated. Then, the motor torque Tm increased by the counter torque ΔTm_opp is reduced in a total amount of: the calculated amount of reduction in the engine torque Te below the lower limit value Te_min; and the required amount of change ΔTe_ref.

According to the example shown in FIG. 10, therefore, the motor torque Tm may be reduced in the required amount of change ΔTm_ref to reduce the input torque Tin to the clutch device 8 in the required amount of change ΔTin_ref, without reducing the engine torque Te further than the lower limit value Te_min.

Figure 11:
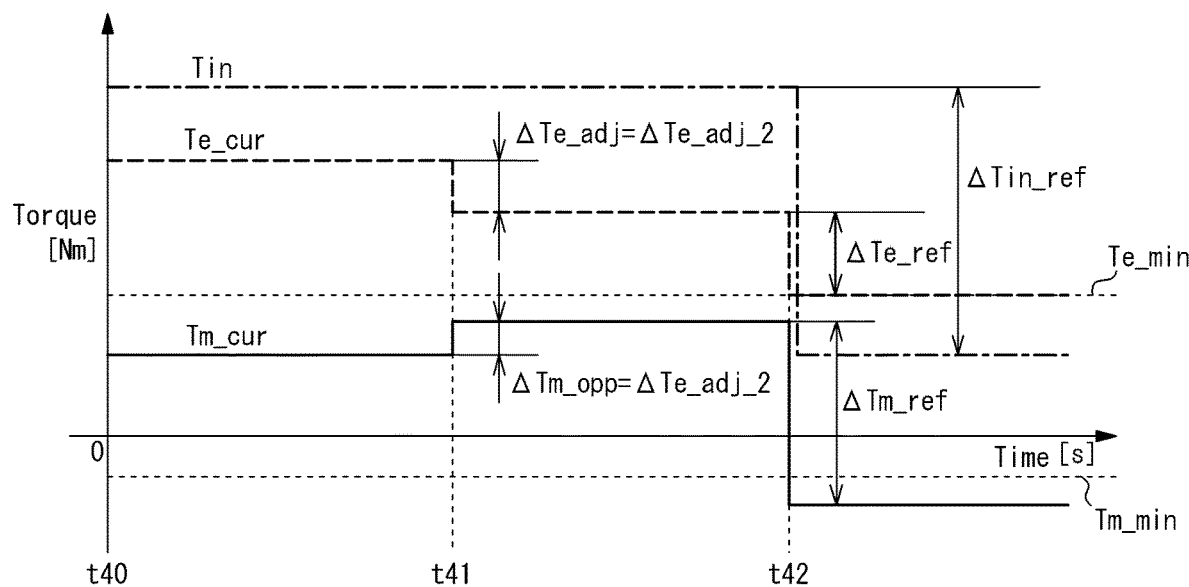
FIG. 11 is a time chart showing temporal changes in the engine torque and the motor torque in a case that the motor torque is allowed to be changed further than the lower limit value but the engine torque is not allowed to be reduced further than the lower limit value, that the rear motor is selected to be controlled to adjust the output torque thereof by the counter torque, and that a margin of the engine torque to change the engine torque in the required amount of change is created preferentially.

FIG. 11 shows an example in which the motor torque Tm is also allowed to be reduced further than the lower limit value Tm_min, but the engine torque Te is also not allowed to be reduced further than the lower limit value Te_min. In the example shown in FIG. 11, the rear motor 2 is selected to be controlled to adjust the motor torque Tm thereof by the counter torque ΔTm_opp due to the fact that the required amount of change ΔTm_ref of the motor torque Tm is greater than the required amount of change ΔTe_ref of the engine torque Te, and a margin of the engine torque Te to change the engine torque Te in the required amount of change ΔTe_ref has to be created preferentially.

In the example shown in FIG. 11, the input torque Tin to the clutch device 8 as a synthesized torque of the output torque Te of the engine 1 and the output torque Tm of the rear motor 2 is maintained to a constant value from point t40. The condition to execute an upshifting of the rear transmission 9 is satisfied at point t41, and hence the input torque Tin is expected to be reduced. In this situation, given that the counter torque ΔTm_opp calculated such that the motor torque Tm will not be reduced further than the lower limit value Tm_min is added to the current motor torque Tm_cur and the engine torque Te is reduced by the adjuster torque ΔTe_adj corresponding to the counter torque ΔTm_opp, and that the engine torque Te is further reduced in the required amount of change ΔTe_ref, the engine torque Te will be reduced further than the lower limit value Te_min. According to the example shown in FIG. 11, therefore, the counter torque ΔTm_opp and the adjuster torque ΔTe_adj are corrected by the procedures shown in FIG. 7 in such a manner that the engine torque Te will not be reduced further than the lower limit value Te_min. The corrected the counter torque ΔTm_opp is added to the current motor torque Tm_cur to increase the motor torque Tm, and the corrected adjuster torque ΔTe_adj is added to the current engine torque Te_cur to reduce the engine torque Te. According to the example shown in FIG. 11, the motor torque Tm is allowed to be reduced further than the lower limit value Tm_min. At point t42, therefore, the engine torque Te is reduced in the required amount of change ΔTe_ref and the motor torque Tm is reduced in the required amount of change ΔTm_ref. Consequently, the input torque Tin to the clutch device 8 is reduced in the required amount of change ΔTin_ref.

According to the example shown in FIG. 11, therefore, the engine torque Te may be reduced in the required amount of change ΔTe_ref and the motor torque Tm may be reduced in the required amount of change ΔTm_ref, without reducing the engine torque Te further than the lower limit value Te_min. That is, the input torque Tin may be reduced in the required amount of change ΔTin_ref without reducing the engine torque Te further than the lower limit value Te_min.

Figure 12:
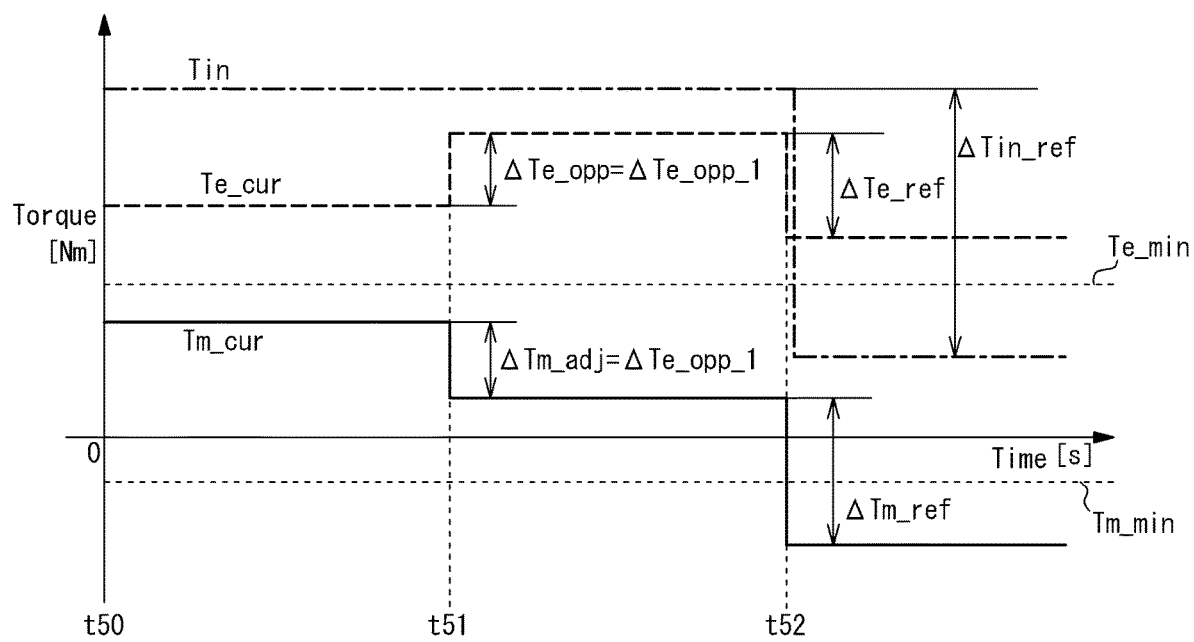
FIG. 12 is a time chart showing temporal changes in the engine torque and the motor torque in a case that the prime mover whose output torque is not allowed to be changed further than the limit value is selected to be controlled to adjust the output torque thereof by the counter torque.

FIG. 12 shows an example in which the motor torque Tm is also allowed to be reduced further than the lower limit value Tm_min, but the engine torque Te is also not allowed to be reduced further than the lower limit value Te_min. In the example shown in FIG. 12, the engine 1 is selected to be controlled to adjust the engine torque Te thereof by the counter torque ΔTe_opp by the procedures shown in FIG. 5.

In the example shown in FIG. 12, the input torque Tin to the clutch device 8 as a synthesized torque of the output torque Te of the engine 1 and the output torque Tm of the rear motor 2 is maintained to a constant value from point t50. The condition to execute an upshifting of the rear transmission 9 is satisfied at point t51, and hence the input torque Tin is expected to be reduced. In this situation, the counter torque ΔTe_opp is added to the current engine torque Te_cur so that the engine torque Te is increased. Specifically, the counter torque ΔTe_opp is set to a difference between the engine torque Te reduced in the required amount of change ΔTe_ref and the lower limit value Tm_min. Therefore, in order not to change the input torque Tin to the clutch device 8, the current output torque Tm_cur of the rear motor 2 is reduced by the adjuster torque ΔTm_adj of same magnitude as the counter torque ΔTe_opp. Then, at point t52, the input torque Tin is reduced in the required amount of change ΔTin_ref.

According to the example shown in FIG. 12, the motor torque Tm is allowed to be reduced further than the lower limit value Tm_min. Therefore, the engine torque Te is reduced in the required amount of change ΔTe_ref, and the motor torque Tm is reduced further than the lower limit value Tm_min in the required amount of change ΔTm_ref.

According to the example shown in FIG. 12, therefore, the engine torque Te may be reduced in the required amount of change ΔTe_ref and the motor torque Tm may be reduced in the required amount of change ΔTm_ref, without reducing the engine torque Te further than the lower limit value Te_min. That is, the input torque Tin may be reduced in the required amount of change ΔTin_ref without reducing the engine torque Te further than the lower limit value Te_min.

According to the routines shown in FIGS. 3 to 7, when changing the torque of the prime mover in the required amount, the counter torque is set to an amount of the torque exceeding the limit value. That is, the torque of the prime mover is controlled by a feedforward method. On the other hand, the limit value of the torque changes continuously depending on a state of charge level of the electric storage device, a speed of the prime mover and so on. That is, a magnitude of the counter torque also changes continuously. Therefore, it is preferable to control the torque of the prime mover also by a feedback method in accordance with a change in the magnitude of the counter torque.

However, if the limit value of the torque is changed by changing the torque of the prime mover in the required amount after adding the counter torque to the torque of the prime mover, the torque of the prime mover may be changed further than the limit value unintentionally.

In order to avoid such unintentional exceedance of the torque of the prime mover over the limit value, it is more preferable to control the torque of the selected prime mover by the feedback method using the limit value as a parameter, after or during changing the torque of the prime mover in the required amount. Specifically, it is preferable to control the torque of the selected prime mover in such a manner as to increase a difference from the limit value, while controlling the torque of the other prime mover in such a manner as to achieve the required input torque to the clutch device.

Although the above exemplary embodiment of the present disclosure has been described, it will be understood by those skilled in the art that the present disclosure should not be limited to the described exemplary embodiments, and various changes and modifications can be made within the scope of the present disclosure. For example, the drive force control system may also be applied to a vehicle in which three or more prime movers are connected to the transmission. In addition, the drive force control system may be further configured to adjust the torque of the selected prime mover by the counter torque and adjust the torque of the other prime mover by the adjuster torque, when a total torque of the front wheels and the rear wheels to achieve a required drive force is changed.

What is claimed is:

1. A drive force control system for a vehicle having at least a first prime mover and a second prime mover, that controls a synthesized torque of an output torque of the first prime mover and an output torque of the second prime mover by controlling the output torque of the first prime mover and the output torque of the second prime mover, comprising:
   a controller that controls the output torque of the first prime mover and the output torque of the second prime mover,
   wherein the controller is configured to
   calculate a required amount of change in the synthesized torque,
   calculate a first required amount of change in the output torque of the first prime mover and a second required amount of change in the output torque of the second prime mover based on the required amount of change in the synthesized torque,
   determine whether the output torque of the first prime mover will be changed further than a limit value given that a current output torque thereof is changed in the first required amount of change,
   determine whether the output torque of the second prime mover will be changed further than a limit value given that a current output torque thereof is changed in the second required amount of change,
   select one of the first prime mover and the second prime mover whose output torque will be changed further than the limit value given that the current output torque is changed in the required amount of change,
   adjust the output torque of the selected prime mover by a counter torque to increase a difference from the limit value before changing the synthesized torque, and
   adjust the output torque of the other prime mover by an adjuster torque that is a torque in the opposite direction to and of the same magnitude as the counter torque before changing the synthesized torque.

2. The drive force control system for the vehicle as claimed in claim 1, wherein the controller is further configured to select one of the prime movers whose required amount of change in the output torque is greater so as to adjust the output torque thereof by the counter torque, if both of the output torques of the first prime mover and the second prime mover are expected to be changed further than the limit values.

3. The drive force control system for the vehicle as claimed in claim 1, wherein the controller is further configured to select one of the prime movers that it is necessary to create a margin to change the output torque thereof in the required amount of change so as to adjust the output torque thereof by the counter torque, if both of the output torques of the first prime mover and the second prime mover are expected to be changed further than the limit values.

4. The drive force control system for the vehicle as claimed in claim 1, wherein the controller is further configured to select one of the prime movers whose output torque is not allowed to be changed further than the limit value so as to adjust the output torque thereof by the counter torque, if both of the output torques of the first prime mover and the second prime mover are expected to be changed further than the limit values.

5. The drive force control system for the vehicle as claimed in claim 1, wherein the controller is further configured to calculate the counter torque based on an exceedance of the output torque of the selected prime mover changed in the required amount of change from the limit value.

6. The drive force control system for the vehicle as claimed in claim 1, wherein the controller is further configured to
calculate an exceedance of the output torque of the selected prime mover changed in the required amount of change from the limit value,
set the adjuster torque to a torque of same magnitude as the exceedance of the output torque of the selected prime mover from the limit value,
determine whether the output torque of the other prime mover will be changed further than the limit value given that the output torque of the other prime mover is adjusted by the adjuster torque, and
correct the counter torque to an exceedance of the output torque of the other prime mover changed in the required amount of change from the limit value.

7. The drive force control system for the vehicle as claimed in claim 1, wherein the controller is further configured to control the output torque of the selected prime mover in such a manner as to increase the difference from the limit value, while controlling the output torque of the other prime mover in such a manner as to achieve the required synthesized torque, after or during changing the output torques of the first prime mover and the second prime mover in the first required amount of change and the second required amount of change.

8. The drive force control system for the vehicle as claimed in claim 1,
wherein the vehicle comprises
an engine;
a motor whose output torque can be added to an output torque of the engine;
a clutch device to which a synthesized torque of the output torque of the engine and the output torque of the motor is delivered, and in which a torque transmitting capacity can be varied; and
a transmission connected to an output side of the clutch device that executes a speed change operation, and
the controller is further configured to change the synthesized torque while reducing the torque transmitting capacity of the clutch device when executing the speed change operation of the transmission.

* * * * *